(12) United States Patent
Fay, II et al.

(10) Patent No.: US 10,464,602 B2
(45) Date of Patent: Nov. 5, 2019

(54) LIMITED SLIP DIFFERENTIAL DRIVE SYSTEM AND METHODS OF USING THE SAME

(71) Applicant: CNH Industrial America, LLC, New Holland, PA (US)

(72) Inventors: Jeffrey B. Fay, II, Oxford, PA (US); Philip J. Ehrhart, Narvon, PA (US)

(73) Assignee: CNH Industrial America LLC, New Holland, PA (US)

( * ) Notice: Subject to any disclaimer, the term of this patent is extended or adjusted under 35 U.S.C. 154(b) by 305 days.

(21) Appl. No.: 15/639,712

(22) Filed: Jun. 30, 2017

(65) Prior Publication Data

US 2019/0002023 A1 Jan. 3, 2019

(51) Int. Cl.
| | | |
|---|---|---|
| *B60K 17/10* | (2006.01) |
| *B62D 11/10* | (2006.01) |
| *F16H 48/18* | (2006.01) |
| *F16H 61/4035* | (2010.01) |
| *F16H 48/36* | (2012.01) |
| *B60K 17/16* | (2006.01) |
| *B62D 5/12* | (2006.01) |
| *B62D 11/00* | (2006.01) |
| *B62D 11/04* | (2006.01) |
| *B62D 11/24* | (2006.01) |

(52) U.S. Cl.
CPC .............. *B62D 11/10* (2013.01); *B60K 17/10* (2013.01); *B60K 17/20* (2013.01); *B62D 5/12* (2013.01); *B62D 11/005* (2013.01); *B62D 11/04* (2013.01); *B62D 11/24* (2013.01); *F16H 48/18* (2013.01); *F16H 48/36* (2013.01); *F16H 61/4035* (2013.01); *F16H 2048/364* (2013.01)

(58) Field of Classification Search
CPC ........ B62D 11/10; B62D 5/12; B62D 11/005; B62D 11/04; B60K 17/10; B60K 17/20; F16H 48/18; F16H 48/36; F16H 61/4035
See application file for complete search history.

(56) References Cited

U.S. PATENT DOCUMENTS

| | | | |
|---|---|---|---|
| 3,736,732 A | | 6/1973 | Jennings et al. |
| 6,062,332 A | * | 5/2000 | Stephenson ............ B60K 17/10 180/305 |
| 6,230,829 B1 | | 5/2001 | Martin et al. |
| 6,662,895 B1 | * | 12/2003 | Bednar .................. F16H 61/42 180/308 |
| 7,540,825 B2 | | 6/2009 | Hofer |
| 8,020,648 B2 | | 9/2011 | Otto |
| 8,496,256 B2 | | 7/2013 | Bebernes et al. |
| 8,997,902 B2 | | 4/2015 | Martin et al. |
| 9,101,090 B2 | | 8/2015 | Pierce et al. |
| 9,439,341 B2 | | 9/2016 | Bebernes et al. |
| 2015/0223386 A1 | | 8/2015 | Nafziger et al. |
| 2016/0304116 A1 | | 10/2016 | Maglsson et al. |

* cited by examiner

*Primary Examiner* — Tony H Winner
*Assistant Examiner* — Michael R Stabley

(57) ABSTRACT

The disclosure relates to a steering system useful for providing stable control during rear axle steering of harvesters, such as self-propelled windrowers. The steering system utilizes left and right-hand side drive motors, and allows for hydraulic fluid to flow between the left and right-hand side drive motors through crossover lines to regulate a speed differential between wheels when the steering system is actuated into a rear axle steering operation mode.

20 Claims, 12 Drawing Sheets

Dual Path Operation Mode

Dual Path Normal Straight/Neutral Operation Mode

Dual Path Right Turn Operation Mode

Normal Field Operation Mode

Limited Slip Differential Normal Straight Operation Mode

Limited Slip Differential Right Turn Operation Mode

Rear Axle Steering Road Operation Mode

US 10,464,602 B2

LIMITED SLIP DIFFERENTIAL DRIVE SYSTEM AND METHODS OF USING THE SAME

BACKGROUND

Harvesters such as windrowers, tractors, and forage harvesters, have to operate effectively in normal and high-speed modes. Typical construction for such vehicles include front ground wheels mounted on the frame at fixed angles parallel to each other and parallel to a center line of the frame and rear ground wheels mounted on a respective caster. Each of the front ground wheels is typically driven by a respective drive motor which allows variable speed in both the forward and reverse directions such that steering of the tractor is effected by a differential in speed between the front wheels with the rear wheels following the steering in a castering action.

The front wheels only are driven and are driven in a manner which allows full control in the forward and reverse directions so that steering is effected by a differential speed between the two front wheels with the rear wheels following in the conventional castering action. The hydraulic differential or dual path steering of traditional harvesters is generally unstable during high-speed operation. The steering generally functions by varying the speed of the right and left-hand side drive wheels by adjusting the flow to the right-hand and left-hand ground drive motors through the mechanical varying of the swash-plate angles of the ground drive pumps. The steering of the vehicle results when the inside wheels slows and the outside wheel speeds up. Such systems generally require that the ground drive motors are able to overcome the momentum of the harvester when initiating a turn, which can force the inside wheel in a coasting operation that must be overcome or dissipated before the harvester can turn.

Overcoming or dissipating the coasting operation of the inside wheel results in delayed steering reaction, which can negatively affect the overall steering performance of the harvester. The addition of rear steer can assist in overcoming such delay. However, such systems retain front differential steering during high-speed operation, which due to variances in wheel motor efficiencies, steering cylinder calibrations, or the like, can cause the front differential steering to be out of phase with the rear steer. This can result in the front steering fighting or resisting the rear steer, causing the harvester to operating in a darting or unstable manner during high-speed road operation. Thus, conventional front wheel steering systems for harvesters having rear steer operate in an unstable manner during high-speed road operation.

For example, FIG. 1 shows a perspective view of a conventional windrower 10 having rear steer. The windrower 10 generally includes front wheels 12, 14 rotatably mounted to a frame 16, and a rear suspension system 18 mounted to the frame 16. The windrower 10 includes a cabin 20 configured and dimensioned to receive an operator, and having a plurality of controls for operation of the windrower 10, such as controlling a header (not shown) attachable to the front 22 of the windrower 10, controlling movement of the windrower in a forward direction 24, and controlling movement of the windrower in a reverse direction 26. At the rear 28, the windrower 10 includes casters 30, 32 rotatably mounted on opposing sides of the frame 16, each caster 30, 32 including a caster wheel 34, 36.

FIG. 2 shows a diagrammatic view of a conventional steering system 38 that can be mounted to the frame 16 of the windrower 10. The conventional steering system 38 is of the type disclosed in U.S. Pat. No. 8,997,902, the disclosure of which is incorporated herein by reference in its entireties. The steering system 38 generally includes a steering wheel 40 connected to a steering control valve 42. The steering control valve 42 is connected to a steering drive motor 44 via hydraulic hoses or lines 46, 48. The steering system 38 includes a pump 50 and a reservoir 52 connected to the steering control valve 42 via hydraulic hoses or lines 54, 56, respectively. The pump 50 can be in communication with an engine 58 which is mounted to the frame 16.

The steering system 38 includes drive pumps 60, 62 connected to a control input steering assembly 64 by pintel arms 66, 68. The steering system 38 includes an output shaft 70 with a coupling 72 for connection with the control input shaft 64. The steering system 38 includes a speed selector 74 transmitting an output signal 76 to a hydraulic valve 78. The hydraulic valve 78 is connected to an actuator 80, the actuator 80 being connected to a neutral bias element 82. The actuator can be mounted to a bracket 81.

FIG. 3 is a hydraulic circuit of the conventional steering system 38. The hydraulic circuit shows the steering wheel 40 with the steering control valve 42. The hydraulic circuit shows the right-hand ground drive motor 84 connected with the right-hand ground drive pump 62, and the left-hand ground drive motor 86 connected with the left-hand ground drive pump 60. The pumps 60, 62 are connected to a steering screw 88 in communication with a steering motor 44. As noted above, the front wheels only are driven in a manner which allows full control in the forward and reverse directions so that steering is effected by a differential speed between the two front wheels with the rear wheels following in the conventional castering action. The hydraulic differential or dual path steering of the steering system 38 is generally unstable during high-speed operation.

SUMMARY

The disclosure relates to a steering system for a harvester that provides for stable operation during rear axle steering (e.g., road operation mode). The steering system includes right and left-hand side drive motors associated with wheels of the harvester. The steering system includes a manifold in communication with a steering motor. The manifold is in fluid communication with the left and right-hand side drive motors via crossover lines. During normal, in field operation mode, valves in the manifold are closed and crossover flow is prevented. When the steering system is actuated into a rear axle steering operation mode, crossover flow of hydraulic fluid or oil is permitted through the crossover lines to regulate a speed differential between the wheels, thereby maintaining traction of the wheels and providing stable operation of the harvester.

In accordance with some embodiments of the present disclosure, an exemplary steering system for a harvester is provided. The steering system includes one or more drive pumps in communication with a steering motor, a right-hand side drive motor in communication with the one or more drive pumps via right-hand side drive lines, and a left-hand side drive motor in communication with the one or more drive pumps via left-hand side drive lines. The steering system includes a manifold in communication with the steering motor. The manifold is in fluid communication with the left and right-hand side drive motors via crossover lines. When the steering system is actuated into a rear axle steering operation mode, hydraulic fluid is allowed to flow between the left-hand side and right-hand side drive motors through the crossover lines to regulate a speed differential between wheels associated with the left-hand side and right-hand side drive motors.

The steering system includes one or more valves disposed in the manifold and/or in the crossover lines for regulating flow through the crossover lines between the left-hand side and right-hand side drive motors. In some embodiments, the one or more valves are proportional valves, flow control valves, or the like. The steering system includes a sensor (e.g., a position sensor) configured to detect at least one of a rotational position of a steering wheel or a rear steering cylinder. Based on the detected rotational position, the valves are regulated to vary an amount of flow of the hydraulic fluid through the crossover lines.

When the steering system is actuated into the rear axle steering operation mode and the harvester is driven in a substantially straight line, the valves are regulated to a minimally open position. When the steering system is actuated into the rear axle steering operation mode and the harvester is driven in a turning maneuver, the valves are regulated to open proportionally to the detected rotational position to regulate the speed differential between the wheels associated with the left-hand side and right-hand side drive motors.

The steering system includes a controller configured to receive signals from the sensor regarding the detected rotational position and regulate the valves based on the detected rotational position. When the steering system is actuated into field operation mode, one or more valves in the manifold are closed to prevent the hydraulic fluid from flowing between the left-hand side and right-hand side motors. When the steering system is actuated into the field operation mode, displacements of the right-hand side and left-hand side drive motors are equal. In some embodiments, the right-hand and left-hand side drive motor displacements can be equal in both the field and road operation modes. In some embodiments, the right-hand and left-hand side drive motors can be independently displaced in the field operation mode. The steering system includes a rear axle steering cylinder in fluid communication with the manifold. The steering system includes a steering valve in fluid communication with the manifold, a tank, and a pump supply.

In accordance with embodiments of the present disclosure, an exemplary harvester is provided. The harvester includes a frame, at least one front axle including first and second front wheels pivotally mounted to the front axle, and at least one rear axle including first and second casters pivotally mounted to the rear axle. The harvester includes a steering system including one or more drive pumps in communication with a steering motor, a right-hand side drive motor in communication with the one or more drive pumps via right-hand side drive lines, and a left-hand side drive motor in communication with the one or more drive pumps via left-hand side drive lines. The steering system includes a manifold in fluid communication with the steering motor. The manifold is in fluid communication with the left and right-hand side drive motors via crossover lines. When the steering system is actuated into rear axle steering operation mode, hydraulic fluid is allowed to flow between the left-hand side and right-hand side drive motors through the crossover lines to regulate a speed differential between first and second front wheels associated with the left-hand side and right-hand side drive motors.

The steering system includes one or more valves disposed in the manifold and/or the crossover lines for regulating flow of pressurized fluid through the crossover lines between the left-hand side and right-hand side drive motors. In some embodiments, the one or more valves are proportional valves, flow control valves, or the like. The steering system includes a sensor configured to detect a rotational position of at least one of a steering wheel or a rear steering cylinder. Based on the detected rotational position, the valves are regulated to vary an amount of flow of the hydraulic fluid through the crossover lines with the speed differential of the ground drive motors being controlled by the steering angle of the rear steering wheels.

In accordance with embodiments of the present disclosure, an exemplary method of steering a harvester is provided. The method includes actuating a steering system of the harvester into a rear axle steering operation mode. The steering system includes one or more drive pumps in communication with a steering motor, a right-hand side drive motor in communication with the one or more drive pumps via right-hand side drive lines, and a left-hand side drive motor in communication with the one or more drive pumps via left-hand side drive lines. The steering system includes a manifold in communication with the steering motor. The manifold is in fluid communication with the left and right-hand side drive motors via crossover lines.

The method includes regulating one or more valves within the manifold to control an amount of flow of hydraulic fluid between the left-hand side and right-hand side drive motors through the crossover lines to regulate a speed differential between wheels associated with the left-hand side and right-hand side drive motors. The method includes detecting at least one of a rotational position of a steering wheel or a rear steering cylinder with a sensor, and regulating the amount of flow of the hydraulic fluid between the left-hand side and right-hand side drive motors with a controller based on the detected rotational position.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the disclosed limited slip differential drive system, reference is made to the accompanying figures, wherein.

DETAILED DESCRIPTION

Figure 1:
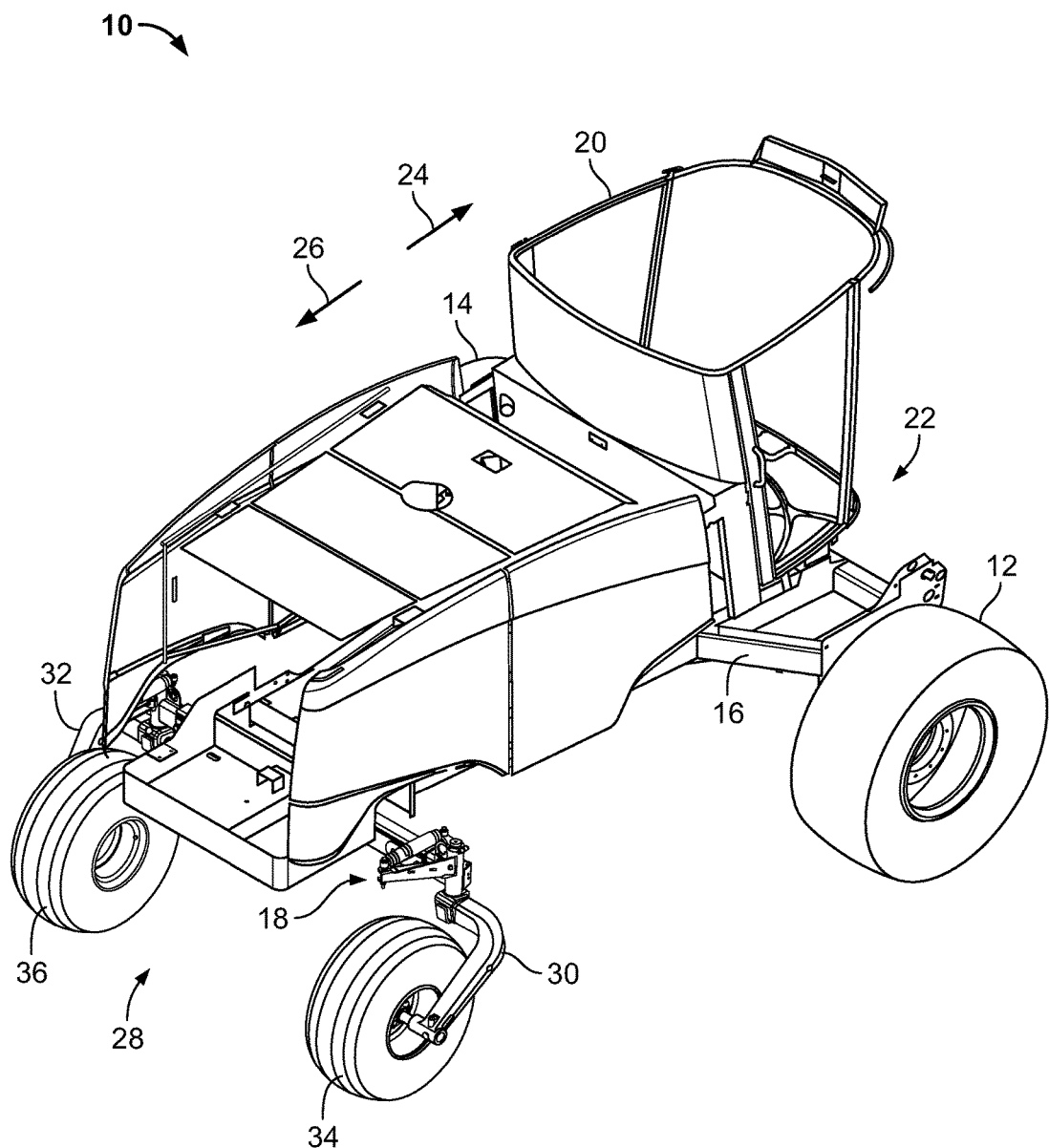
FIG. 1 is a perspective view of a conventional windrower.

Various terms relating to the methods and other aspects of the present disclosure are used throughout the specification and claims. Such terms are to be given their ordinary meaning in the art unless otherwise indicated. Other specifically defined terms are to be construed in a manner consistent with the definition provided herein.

As used in this specification and the appended claims, the singular forms "a," "an," and "the" include plural referents unless the content clearly dictates otherwise.

The term "more than 2" as used herein is defined as any whole integer greater than the number two, e.g., 3, 4, or 5.

The term "plurality" as used herein is defined as any amount or number greater or more than 1. In some embodiments, the term "plurality" means 2, 3, 4, 5, 6 or more.

The terms "left" or "right" are used herein as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes.

The term "about" as used herein when referring to a measurable value such as an amount, a temporal duration, and the like, is meant to encompass variations of ±20%, ±10%, ±5%, ±1%, ±0.5%, ±0.4%, ±0.3%, ±0.2%, ±0.1%, ±0.09%, ±0.08%, ±0.07%, ±0.06%, ±0.05%, ±0.04%, ±0.03%, ±0.02% or ±0.01% from the specified value, as such variations are appropriate to perform the disclosed methods.

The term "harvester" as used herein is defined as a machine that consolidates and/or packages material so as to facilitate the storage and handling of the material for later use. In some embodiments, the harvester is used to harvest agricultural material. In some embodiments, the harvester is a windrower, a forage harvester, lawn mower or a combine including a baling mechanism. In some embodiments, the harvester is a self-propelled windrower.

The term "material" as used herein is defined as a numerous individual items that are harvested or collected by the harvester. In some embodiments, the material is agricultural crop, such as hay or silage. In some embodiments, the material is biomass.

The term "drive system" as used herein is defined as an assembly, hydraulic or mechanical arrangement that allows for control of the front and/or rear wheels of the harvester.

The term "information" as used herein is defined as data values attributed to parameters. In some embodiments, information is digital and/or analog information. In some embodiments, information is the current operable mode of the harvester. In some embodiments, warning information can be audio and/or visual information. In some embodiments, warning information is information that is capable of alerting an operator that an action may need to be taken.

Discussions herein utilizing terms such as, for example, "processing," "computing," "calculating," "determining," or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Some embodiments may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, or harvester. In some embodiments, the harvester includes a software system with executable code that executes different hydraulic states based on operator steering of the harvester. In some embodiments, the disclosure also relates to a computer software product with executable code that automatically toggles between or through different hydraulic states based on operator steering of the harvester. The software program product may be on any medium or a component of a system optionally configured for update or install into the software of an existing harvester.

In some embodiments, the medium may be or may include an electronic, magnetic, optical, electromagnetic, InfraRed (IR), or semiconductor system (or apparatus or device) or a propagation medium. Some demonstrative examples of a computer-readable medium may include a semiconductor or solid state memory, magnetic tape, a removable computer diskette, a Random Access Memory (RAM), a Read-Only Memory (ROM), a rigid magnetic disk, an optical disk, or the like. Some demonstrative examples of optical disks include Compact Disk-Read-Only Memory (CD-ROM), Compact Disk-Read/Write (CD-R/W), DVD, or the like.

In some embodiments, the disclosure relates to a processing system including a processing device suitable for storing and/or executing program code and may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution. In some embodiments, the memory is capable of storing preferred settings or information about steering of the harvester. In some embodiments, the system includes one or a plurality of sensors to detect the steering selected by the operator. The sensors may be hard wired to one or more wires creating a physical connection to one or a plurality of controllers and/or are active sensors can be activated and used over a WiFi hotspot, Bluetooth® or other internet connection with controllers capable of receiving such remote signals.

In some embodiments, input/output or I/O devices (including but not limited to keyboards, displays, pointing devices, etc.) may be coupled to the system either directly or through intervening I/O controllers. In some embodiments, I/O devices may be coupled to the system directly or to I/O controller by an I/O bus (cables and or wires which connect the devices and enable the information to pass therebetween). In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used. Any sensor disclosed herein may function on any disclosed harvester by integration into one or more data processing systems of the harvester. For example, in some embodiments, the disclosure relates to a data processing system including executable software program product configured for sending and receiving information about the steering of the harvester. The system may process this information, optionally store it and then execute code to regulate the hydraulic crossflow. In some embodiments, the system may be configured by the operator to transition the harvester between different hydraulic states in synchrony or substantial synchrony to operator-initiated steering of the harvester. In some embodiments, the data processing system of the harvester transitions the harvester between different hydraulic states in synchrony or substantial synchrony to operator-initiated steering of the harvester depending upon real-time information sent to a controller by a sensor that monitors the steering wheel actuation.

The term "real-time" and the phrase "in real-time" as used herein are defined as a way of describing a process, event, or action that occurs simultaneously with the process of actively operating a harvester. In some embodiments, various sensors continuously sense information about the steering operation of the harvester and transmit that information to a controller in real-time. In some embodiments, an operator may adjust values or thresholds for one or more hydraulic states in real-time through the operator interface by accessing the system electronically and inputting one or a plurality of values.

Many of the fastening, connection, processes and other means and components utilized in this disclosure are widely known and used in the field of the disclosure described, and their exact nature or type is not necessary for an understanding and use of the disclosure by a person skilled in the art, and they will not therefore be discussed in significant detail. Furthermore, the various components shown or described herein for any specific application of this disclosure can be varied and the practice of a specific application of any element may already be widely known or used in the art by persons skilled in the art and each will likewise not therefore be discussed in significant detail.

Windrowers and tractors, such as self-propelled windrowers, are well known in the agricultural industry, and the instant invention can be used with substantially any of such machines. Reference is made, for example, to U.S. Pat. Nos. 9,101,090 and 8,020,648; that illustrate such windrowers, the disclosures of which are incorporated herein by reference in their entireties. Embodiments of the present invention are particularly well suited, but in no way limited to, use with windrowers. The present invention may also find utility in agricultural harvesters including, for example, a self-propelled windrower, a forage harvester, and a lawn mower. Embodiments of the present disclosure are particularly well suited, but in no way limited to, use with any vehicle with a front and rear steer system.

In some embodiments, the method is performed by a harvester comprising a crop supply chamber, a crop gating system, and one or more sensors. In some embodiments, the one or more sensors are capable of determining a range of information. In some embodiments, the one or more sensors are in electronic communication with one or more controllers. In some embodiments, the one or more sensors can be a steering position sensor, a steering cylinder position sensor, combinations thereof, or the like. In some embodiments, additional sensors can be used to assist in field function of the windrower by sensing, e.g., speed of discs/conditioner rolls on disc heads, speed of reels, sickles, and draper belts on draper units, and merger belt speed and/or merger position (if a crop merger is in use), lift arm height, header tilt, ground clearance, combinations thereof, or the like.

The disclosure provides exemplary limited slip differential drive to the normally differentially steered front wheels of a windrower with rear steering. The disclosed open differential front drive eliminates the tendency for the front steering to fight or resist the rear steering, as crossover of the flow of oil between the right-hand and left-hand drive lines allows the front wheels to attain the proper ground speed to match the radius of turn being performed In a fully open differential where flow from both ground drive pumps could potentially flow completely to one ground drive motor, such action could over-speed a ground drive motor resulting in damage to internal components. In addition, a windrower with rear steer could potentially be driven without the header installed, although the header is generally necessary for high-speed balance and stability. Without the header installed, the front of the windrower bears far less weight compared to the rear in instances when the header is installed, which reduces the tractive capacity of the front wheels, again introducing the possibility of one wheel over-speeding due to a loss of traction. The exemplary steering system limits the crossover flow of the hydraulic differential with a proportional valve to eliminate the tendency for a single wheel to over speed while also providing improved gradeability of the windrower. In particular, the exemplary steering system provides the benefit of rear steering with a hydraulic differential while also providing consistent tractive capacity at the ground drive tires, eliminating the chance that a single ground drive motor can over-speed.

For normal, in-field operation mode, the exemplary steering system can use independent ground drive closed loop circuits, e.g., an independent left-hand ground drive pump and motor along with an independent right-hand ground drive pump and motor. The ground drive pump swash plate angles can be varied via a steering valve and steering motor coupled to a steering screw. In some embodiments, a fully electronically controlled system can be used (e.g., electronic sensors, actuators, controllers, and the like). The exemplary steering system incorporates crossover lines to provide crossover flow between the forward and reverse pressure lines from the ground drive pumps to the ground drive motors. The crossover lines each include proportional valves for varying the amount of oil that can cross over between the left-hand and right-hand sides of the system. In some embodiments, the proportional valves can be two-way valves. In some embodiments, the proportional valves can be one-way valves if a parallel system using two proportional valves per side is used. In some embodiments, the proportional valves can be replaced with flow control valves or any other devices that can receive an electronic signal to actively vary flow rate.

The steering control of the ground drive pumps can be decoupled during high speed, rear steer, limited slip operation mode. This can be accomplished with blocking valves on a hydraulic screw system or with electronic lockout on a steer by wire unit. During such operation, the displacement of the pumps can be substantially equal regardless of the steering wheel position, with all steering control provided by the rear wheels. The rear wheel steering system can be activated and deactivated based on selection of field or road operation, respectively. In some embodiments, such control can be achieved by the steering wheel via one or more sensors, valves, or the like, and does not affect the essence of the differential drive system disclosed herein. In embodiments using a hydraulic steering system, a steering cylinder operated by the steering valve can be used. In an electronic steering system, the steering cylinder can be operated by an electro-hydraulic valve. In either case, a steering position sensor can be used on either the steering cylinder or caster in order to provide steering position feedback.

The exemplary steering system can be operated in field operation mode (e.g., normal operation), and road operation mode (e.g., limited slip differential operation). During field operation, the windrower necessitates differential/dual path steering for zero turn maneuvers. The steering system includes the independent left-hand and right-hand ground drive pumps and motors, with flow to the ground drive motors being varied with the mechanical adjustment of the swash plate angles of the ground drive pumps. During field operation, the proportional valves connecting the right-hand and left-hand side ground drivelines remains closed, not allowing crossover flow and forcing the system to function as a purely differentially steered system.

During road operation, the differential steering can be locked out, with the left and right-hand ground drive pumps displacing the same swash plate angle based on the position of the forward-neutral-reverse (FNR) lever. The control system can lock out the steering to the pumps and open steering to the rear steer system. This can be achieved by blocking the steering flow/command to the pumps and directing it to the rear steering system. In some embodiments, a locked steering screw can be used. In some embodiments, electronically matching pumps can be used, depending on whether a hydraulic steering system or an electronic steering system is used.

The overall displacement of the pumps can be controlled with the FNR lever position, which will control the forward and reverse flow only. The limited slip differential can operate by varying the amount of flow allowed to cross over between the left and right-hand sides by varying the opening of the proportional valves. This can be controlled by a sensor on the steering wheel and/or on the rear steering cylinder, which will proportionally adjust the crossover based on the steering input angle/rear steering position.

During straight-line operation, the proportional valves can allow very little crossover flow, just enough to keep the front wheels from fighting the rear steer. This ensures that should one front drive tire break traction, the limited crossover flow can maintain drive to the wheel with more traction and not result in over-speeding of the wheel motor. During a turning maneuver, the proportional valves can open to allow more flow to cross over, thereby allowing the inside wheel to rotate more slowly than the outside wheel. The opening of the proportional valves, and thereby the amount of crossover flow, can be determined by a steering position sensor. In particular, the more steering input is applied, the more rear steer is applied and more flow is allowed to cross over. The amount of opening can be determined either by an active calibration or based on known variables, such as valve flow rate versus current. The steering system thereby limits the ability for one wheel to severely over-speed the other. In some embodiments, the steering system can substantially match the optimum differential ground speed based on the steering angle of the rear wheels.

Figure 2:
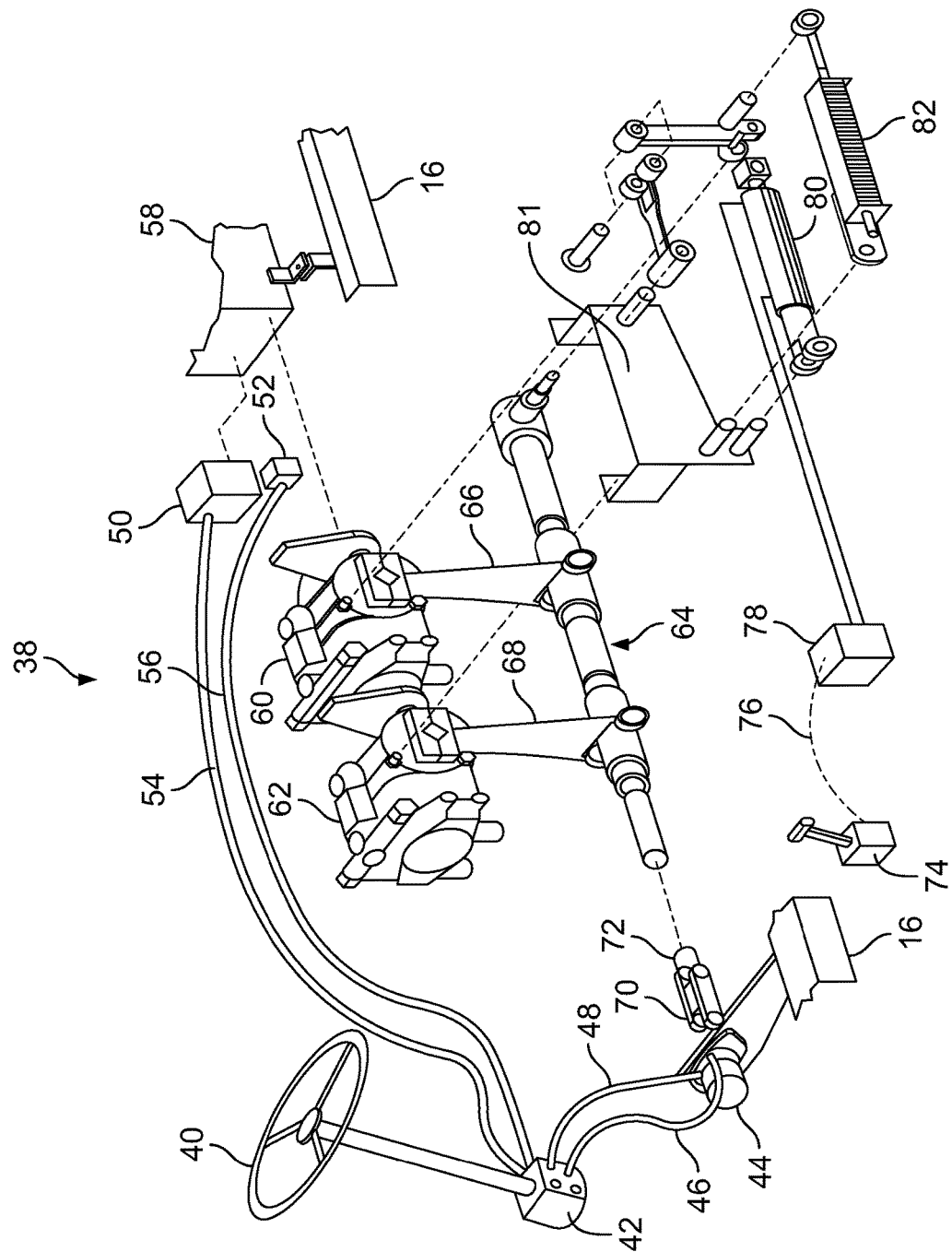
FIG. 2 is a diagrammatic view of a steering system of a conventional windrower.
Figure 4:
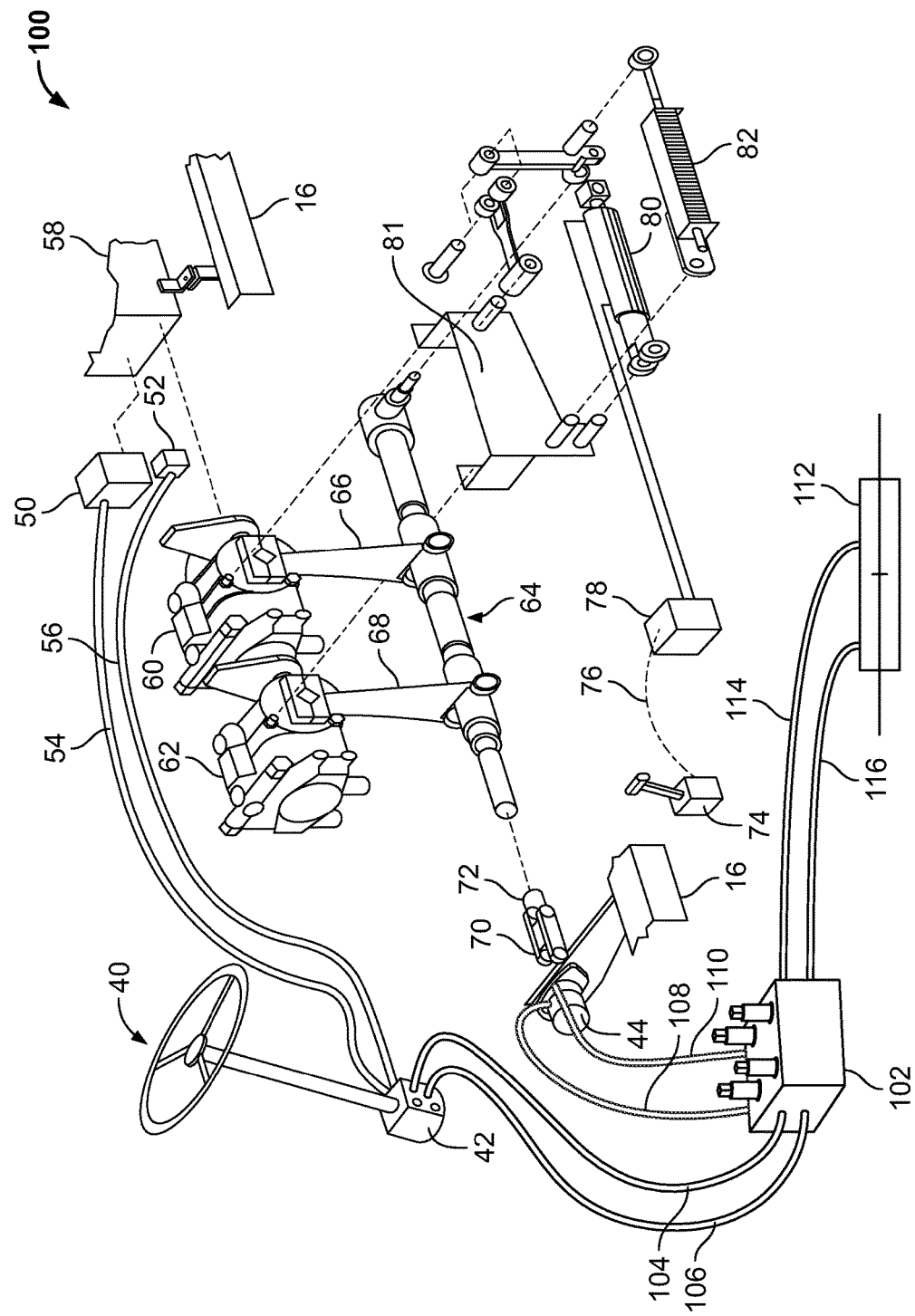
FIG. 4 is a diagrammatic view of an exemplary steering system of the present disclosure.

FIG. 4 shows a diagrammatic view of an exemplary steering system 100 of the present disclosure. The steering system 100 can include some components substantially similar to the steering system 38 of FIG. 2. Therefore, similar components are represented by the same reference numbers. The steering system 100 can function substantially similarly to the steering system 38 during the normal field operation mode with dual path steering. For road operation, the steering system 100 includes a manifold 102 in fluid communication with the steering valve 42 and the steering motor 44. In particular, the manifold 102 is in fluid communication with the steering valve 42 via hydraulic hoses or lines 104, 106 (e.g., supply and return lines), and in fluid communication with the steering motor 44 via hydraulic hoses or lines 108, 110 (e.g., supply and return lines). The steering system 100 includes a rear axle steering cylinder 112 in fluid communication with the manifold 102 via hydraulic hoses or lines 114, 116 (e.g., supply and return lines).

When actuated into road operation, the operator can center the steering assembly 64 (e.g., with the steering wheel 40) and the manifold 102 locks flow to and from the steering motor 44, locking the steering neutral position. In such configuration, both ground drive pumps 60, 62 maintain the same displacement and have only fore/aft control. The manifold 102 is then actuated to open flow between the steering valve 42 and the steering cylinder 112 by fluidically connecting the lines 104, 106 with the lines 114, 116. This allows the operator to control the extension and retraction of the steering cylinder 112, thereby steering the rear wheels.

Figure 5:
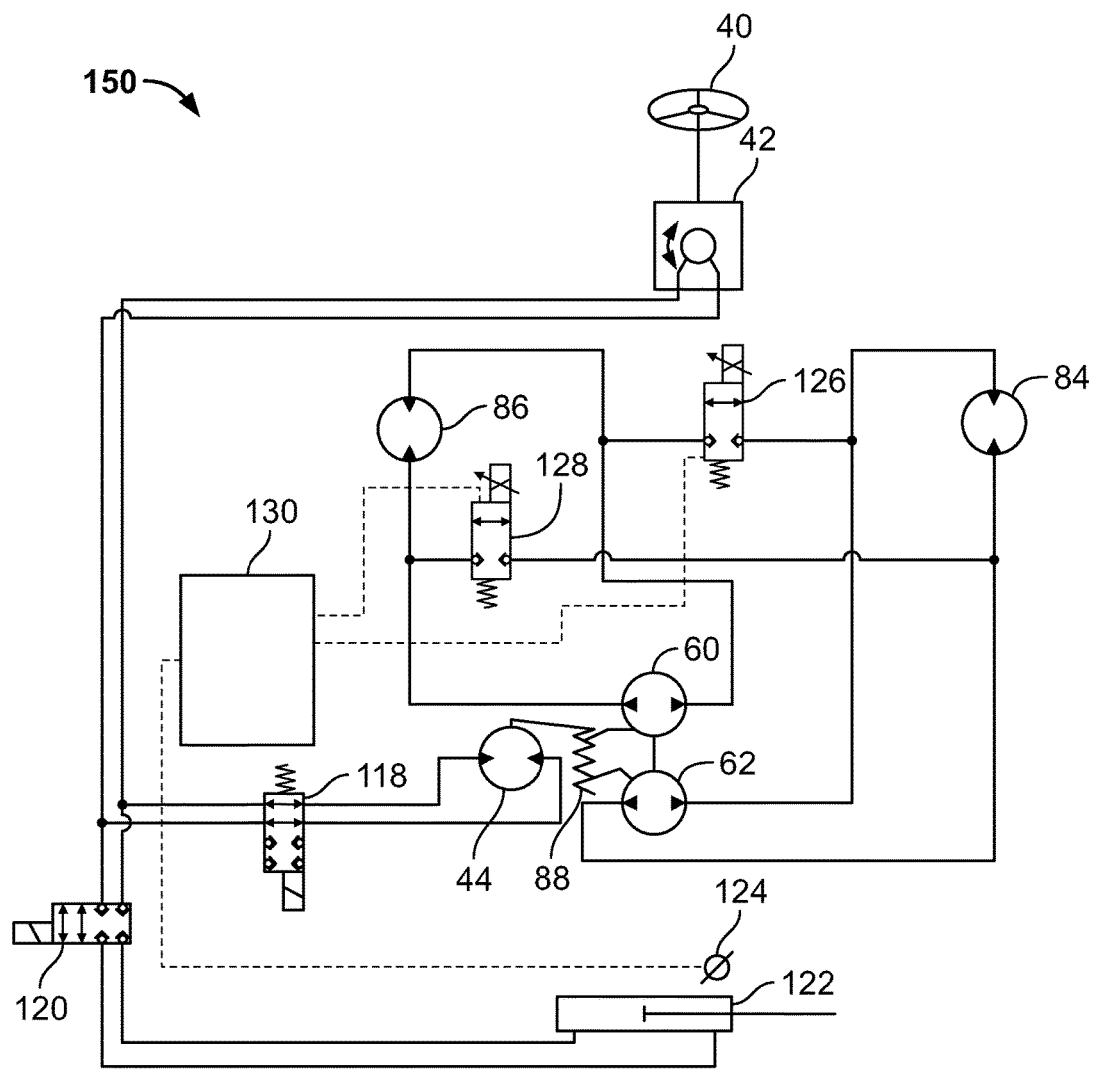
FIG. 5 is a hydraulic circuit of an exemplary steering system of FIG. 4.

FIG. 5 is a hydraulic circuit 150 of the steering system 100 of FIG. 4 (e.g., a fully hydraulic steering system). The hydraulic circuit 150 shows the steering wheel 40 with the steering control valve 42. The hydraulic circuit 150 shows the right-hand motor 84 connected with the right-hand pump 62, and the left-hand motor 86 connected with the left-hand pump 60. The pumps 60, 62 are connected to a steering screw 88 which in turn is connected to the steering motor 44. The hydraulic circuit 150 includes a differential steer blocking valve 118. The hydraulic circuit 150 includes a rear steer enable valve 120 and a rear steer cylinder 122. The hydraulic circuit 150 includes a rear steer position sensor 124 and valves 126, 128 in communication with a controller 130.

Figure 6:
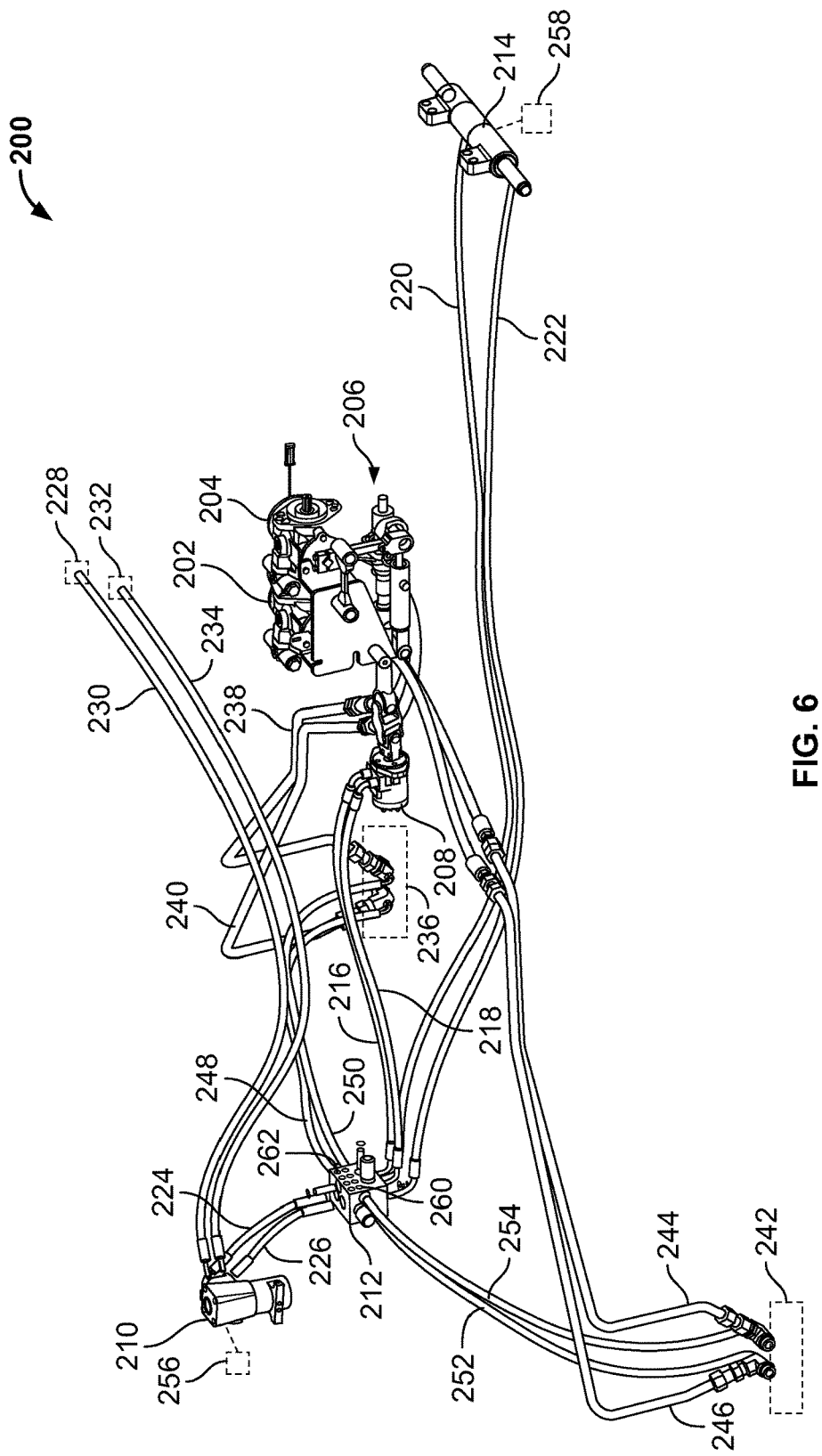
FIG. 6 is a diagrammatic view of an exemplary steering system of the present disclosure.

FIG. 6 shows a diagrammatic view of an exemplary steering system 200 of the present disclosure. In particular, FIG. 6 shows a hydraulic differential system integrated into a hydraulic steering and ground drive system. The steering system 200 includes ground drive pumps 202, 204 connected to a steering assembly 206. The steering system 200 includes a steering motor 208 in fluid communication with the steering assembly 206. The steering system 200 includes a steering valve 210, a crossover/lockout manifold 212, and a rear axle steering cylinder 214.

The manifold 212 is in fluid communication with the steering motor 208 via supply and return hydraulic hoses or lines 216, 218. The manifold 212 is in fluid communication with the steering cylinder 214 via supply and return hydraulic hoses or lines 220, 222. The steering valve 210 is in fluid communication with the manifold 212 via supply and return hydraulic hoses or lines 224, 226. The steering valve 210 is in fluid communication with a reservoir tank 228 via a hydraulic hose or line 230, and in fluid communication with a pump supply 232 via a hydraulic hose or line 234.

The steering assembly 206 is in fluid communication with a right-hand side drive motor 236 via supply and return hydraulic hoses or lines 238, 240. It should be understood that the supply lines discussed herein refer to pressure or drive lines. Similarly, the steering assembly 206 is in fluid communication with a left-hand side drive motor 242 via supply and return hydraulic hoses or lines 244, 246. The steering system 200 includes a first set of supply and return hydraulic crossover hoses or lines 248, 250 fluidically connecting the manifold 212 with the right-hand side ground drive motor 236, and a second set of supply and return hydraulic crossover hoses or lines 252, 254 fluidically connecting the manifold 212 with the left-hand side ground drive motor 242. The manifold 212 includes two or more valves 260, 262 (e.g., proportional valves, flow control valves, or the like) configured to regulate the amount of crossover flow through the lines 248-254, respectively. The steering system 200 can include one or more steering sensors 256, 258 configured to detect the steering position of the steering valve 210 and/or the steering cylinder 214, and transmit signals to a controller regarding the detected steering position.

During normal field operation, the left-hand side and right-hand side can be closed loop circuits, with the wheel speed and steering being controlled by varying displacement of the ground drive pumps 202, 204 with respect to one another by turning a steering screw through lines 216, 218 to the steering motor 208. The ground drive motor displacements therefore remain substantially equal to one another for the normal field operation.

During rear axle steering (e.g., road operation), the manifold 212 can be actuated to lock the steering motor 208 in a neutral position and forces steering flow through the lines 220, 222 to the steering cylinder 214. Valves 260, 262 in the manifold 212 are regulated to open to allow flow between the left-hand side and right-hand side ground drive motors 236, 242 through the crossover lines 248-254. In particular, the motors 236, 242 maintain fluid communication between the left-hand side drive port and the right-hand side drive port, and the left-hand side return port to the right-hand side return port via the crossover lines 248-254. The crossover valves 260, 262 can be of a proportional valve type that open a predetermine amount based on the steering wheel angle (measured with the sensor 256) to limit the amount of flow between the ground drive motors 202, 204 to allow for only adequate speed differential to make the commanded turn.

Thus, in the rear steer operation mode, the dual path operation is stopped, and the pumps are equalized with substantially equal speed on each pump. The crossover lines are opened and the oil or hydraulic fluid flows between the left and right-hand sides freely in a passive crossover flow system. Rather than controlling the flow of fluid through the crossover lines with pumps, the flow is regulated based on the degree of opening or closing of the proportional valves. For example, position sensors can be used to sense the amount of rotation of the steering wheel. Based on the angle of rotation, the controller can determine the amount of oil to allow to pass through the crossover lines. As an example, a 20% turn of the steering wheel can equate to opening of the proportional valves by approximately 20% flow. However, it should be understood that the degree of steering wheel turn does not need to be equal to the percentage of opening of the proportional valve. As oil flows through the crossover lines between the left and right-hand sides, the speed of one wheel increases relative to the other wheel to ensure stable turning operation in the road operation.

Figure 7:
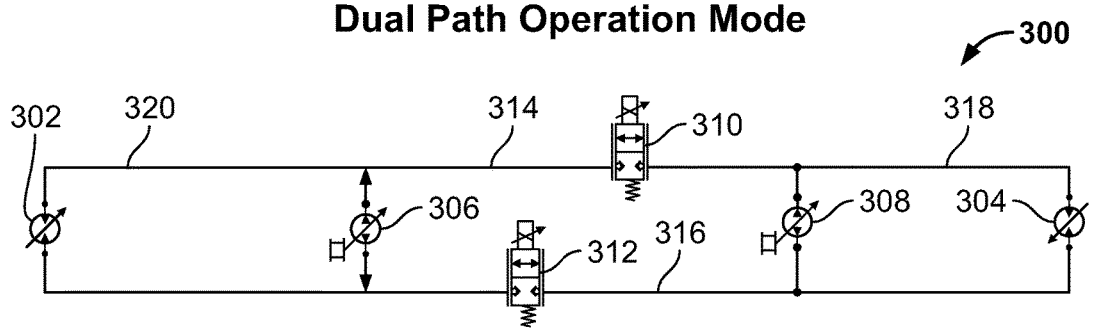
FIG. 7 is a static image of a hydraulic circuit for an exemplary ground drive system of the present disclosure.

FIG. 7 is a static image of a hydraulic circuit 300 for the exemplary limited slip differential ground drive system of steering system 200. The hydraulic circuit 300 includes a left-hand side wheel motor 302, a right-hand side wheel motor 304, a left-hand side ground drive pump 306, and a right-hand side ground drive pump 308. The hydraulic circuit 300 includes a crossover or proportional valve 310, 312 on each of the crossover lines 314, 316. The hydraulic circuit 300 also includes right-hand side ground drive lines 318 and left-hand side ground drive lines 320.

Figure 8:
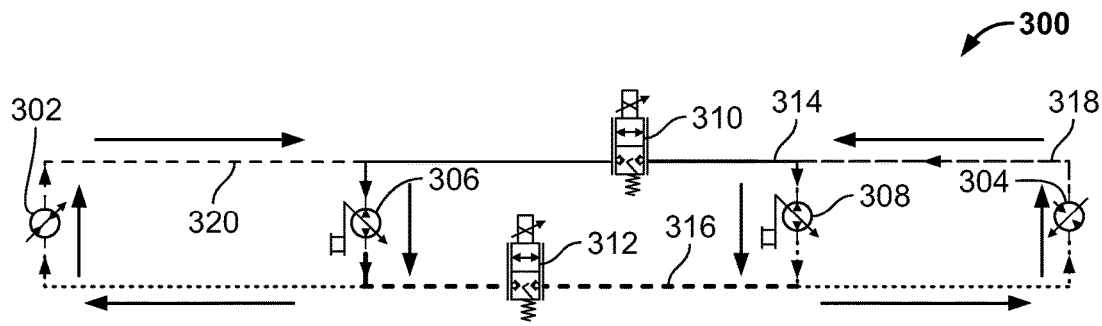
FIG. 8 is the hydraulic circuit of FIG. 7 in a dual path normal straight/neutral operation mode.
Figure 9:
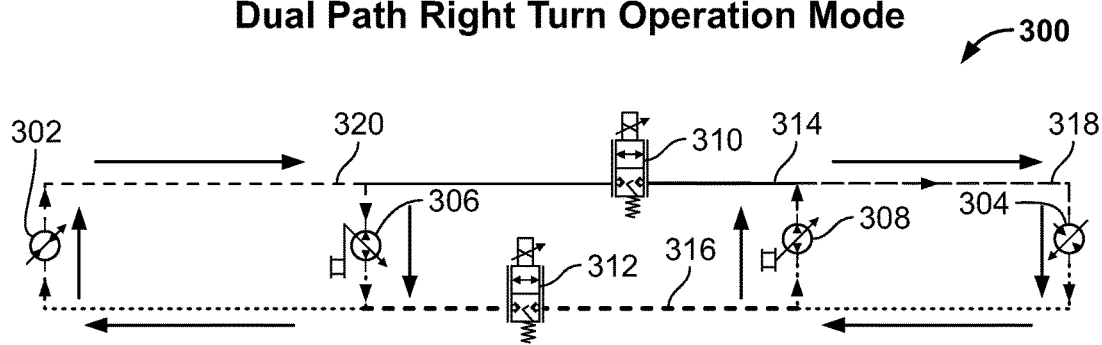
FIG. 9 is the hydraulic circuit of FIG. 7 in a dual path right turn operation mode.

FIG. 8 is the hydraulic circuit 300 of FIG. 6 in a dual path normal straight/neutral operation mode. In this configuration, both ground drive pumps 306, 308 are at the same displacement and, therefore, both ground drive motors 302, 304 are tuning at the same speed. FIG. 9 is the hydraulic circuit 300 of FIG. 7 in a dual path right turn operation mode. In such configuration, the right-hand side drive pump 308 has been reversed to perform a zero radius turn. In the operation modes shown in FIGS. 8 and 9, both crossover valves 310, 312 are actuated into the closed position.

Figure 10:
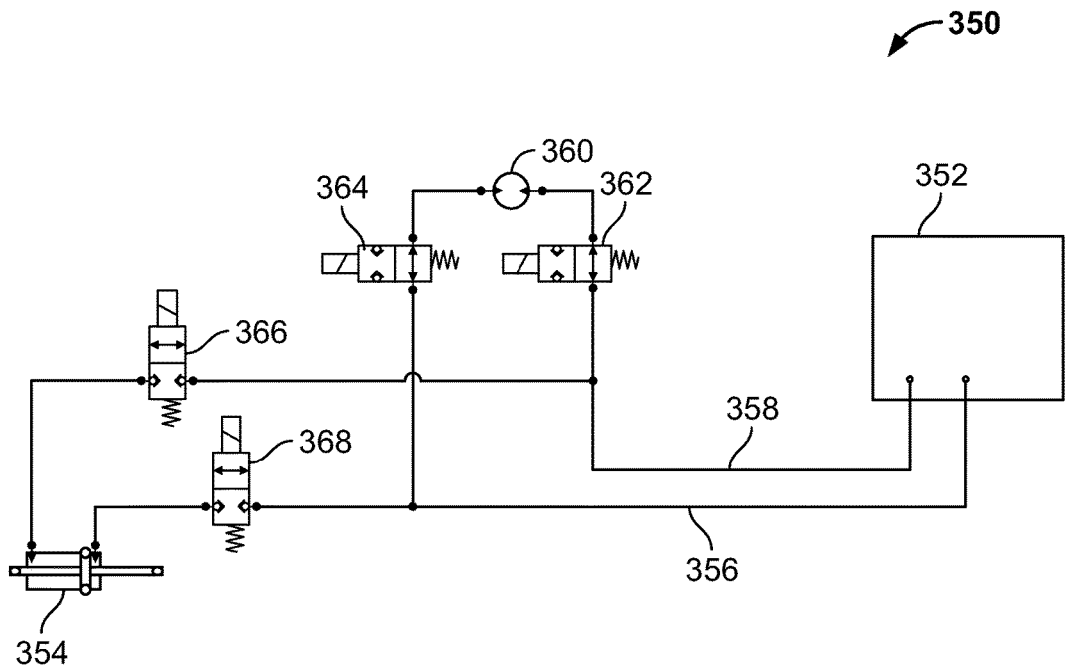
FIG. 10 is a static image of a hydraulic circuit of an exemplary steering system of the present disclosure.

FIG. 10 is a static image of a hydraulic circuit 350 for an exemplary dual path and rear axle steering selection system. The hydraulic circuit 350 includes a steering valve 352 in fluid communication with a steering cylinder 354 via hydraulic lines 356, 358. The steering cylinder 354 can be selectively coupled and/or decoupled from the casters via hydraulic lines. The casters can be coupled to the frame of the harvester (e.g., the rear of the frame 16 of FIG. 1). The hydraulic circuit 350 includes a steering motor 360, and valves 362-368 between the steering valve 352, the steering motor 360, and the steering cylinder 354. The hydraulic circuit 350 is shown as normally dual path, where the blocking valves 362, 364 for the steering motor 360 are normally open, and the blocking valves 366, 368 for the steering cylinder 354 are normally closed.

The steering valve 360 can be a mechanical hydraulic design, an electronically controlled valve controlled by the output of a sensor on the steering wheel, or the like. The control logic for selection of dual path and rear axle steering with a limited slip differential can be substantially the same for both mechanical and electronic steering valves. The functionality can be substantially similar if the dual path control is accomplished with electronic displacement control (EDC) variable displacement pumps and the rear axle steering cylinder is controlled by an electronic steering valve.

Figure 11:
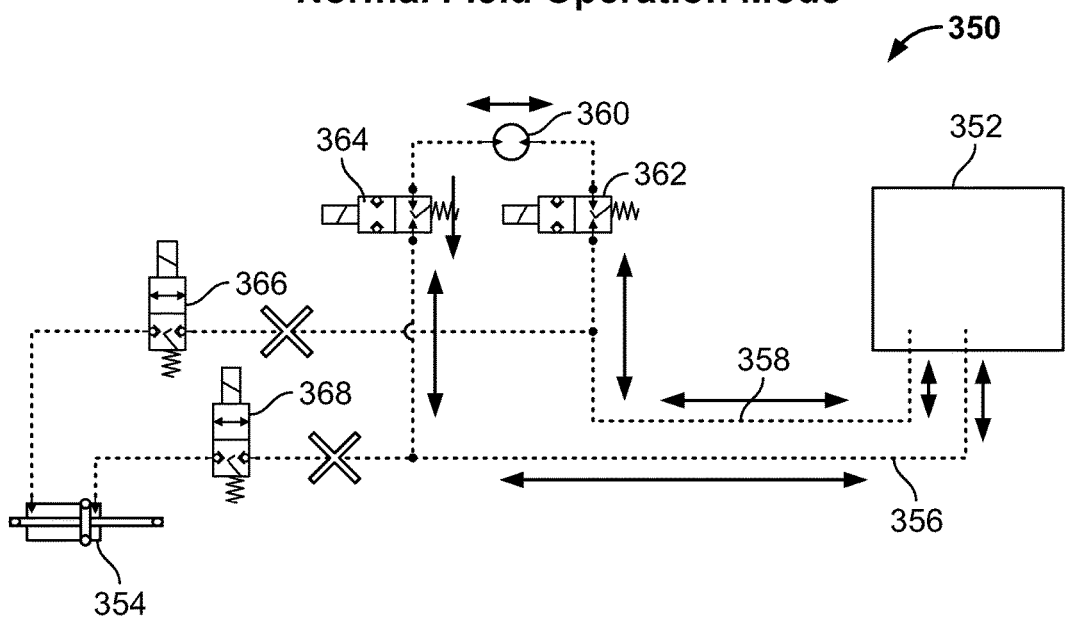
FIG. 11 is the hydraulic circuit of FIG. 10 in a normal field operation mode.

FIG. 11 is the hydraulic circuit 350 in a normal field operation mode (e.g., dual path steering). Flow is free through the steering motor 360 only via the hydraulic lines passing through the valves 362, 364. The steering cylinder 354 is locked in a home position with closure of the valves 366, 368.

Figure 12:
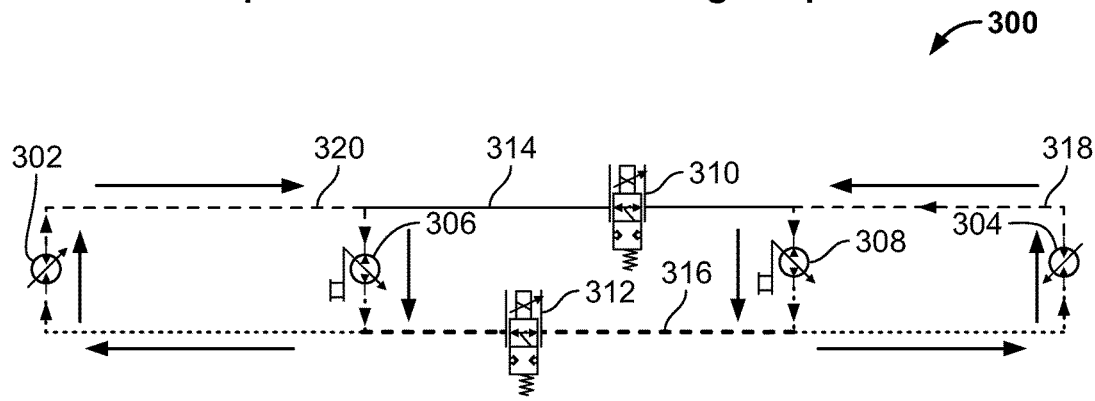
FIG. 12 is the hydraulic circuit of FIG. 7 in a limited slip differential normal straight operation mode.

FIG. 12 is the hydraulic circuit 300 of FIG. 7 in a limited slip differential normal straight operation mode with rear axle steering. The crossover valves 310, 312 are actuated into an open position, but there is no flow through them. This lack of flow occurs because the windrower is traveling in a substantially straight line with no speed differential of the drive motors 302, 304. The valves 310, 312 are opened to allow for minimal flow to balance the drive motors 302, 304, and prevent the front wheel steering from fighting or resisting the rear wheel steering while driving straight.

Figure 13:
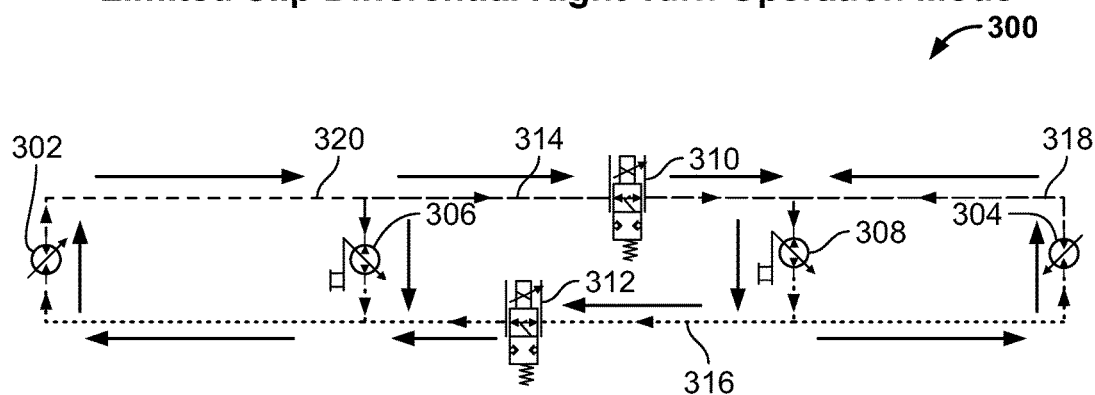
FIG. 13 is the hydraulic circuit of FIG. 7 in a limited slip differential right turn operation mode.

FIG. 13 is the hydraulic circuit 300 of FIG. 7 in a limited slip differential right turn operation mode with rear axle steering. The rear wheels have been steered and are forcing the right-hand side wheel motor 304 to slow (e.g., smaller radius) and the left-hand wheel motor 302 to speed up to match the turn (e.g., larger radius). Thus, the excess flow from the right-hand drive circuit flows over to the drive of the left-hand side through the crossover valve 312 to drive the left-hand side wheel motor 302 faster, matching the required wheel speeds for the angle of the turn. The amount of flow allowed to cross over is limited through the proportional valves 310, 312 to an amount great enough to only allow the desired turn radius (e.g., limited slip). Such operation will not allow one motor to severely over speed (e.g., one wheel having traction while the other does not), ensuring that both wheels maintain traction during rear axle steering in road operation mode.

Figure 14:
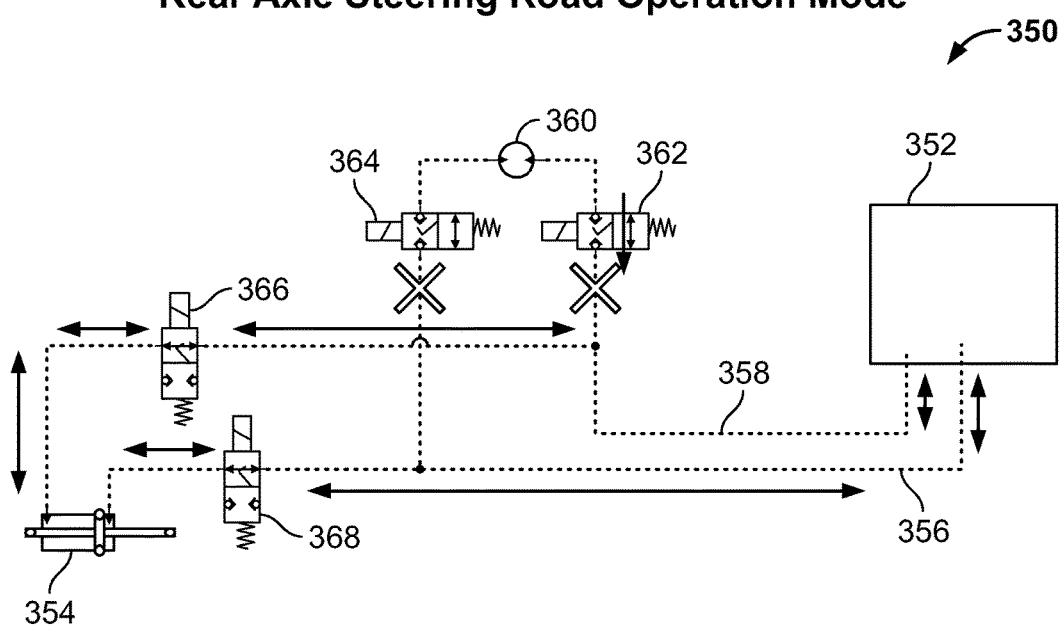
FIG. 14 is the hydraulic circuit of FIG. 10 in a rear axle steering road operation mode.

FIG. 14 is the hydraulic circuit 350 of FIG. 10 in a rear axle steering road operation mode. Flow is free to the steering cylinder 354 only through the valves 366, 368, with the steering motor 360 locked in a neutral position by closing the valves 362, 364. Both ground drive pumps are locked at equal displacements with only fore/aft control. If the windrower is used with EDC ground drive pumps, such pumps can be held at matched displacement, varying only for fore/aft speed control during limited slip differential operation. Otherwise, the control logic can be substantially similar as for the mechanical system.

Figure 3:
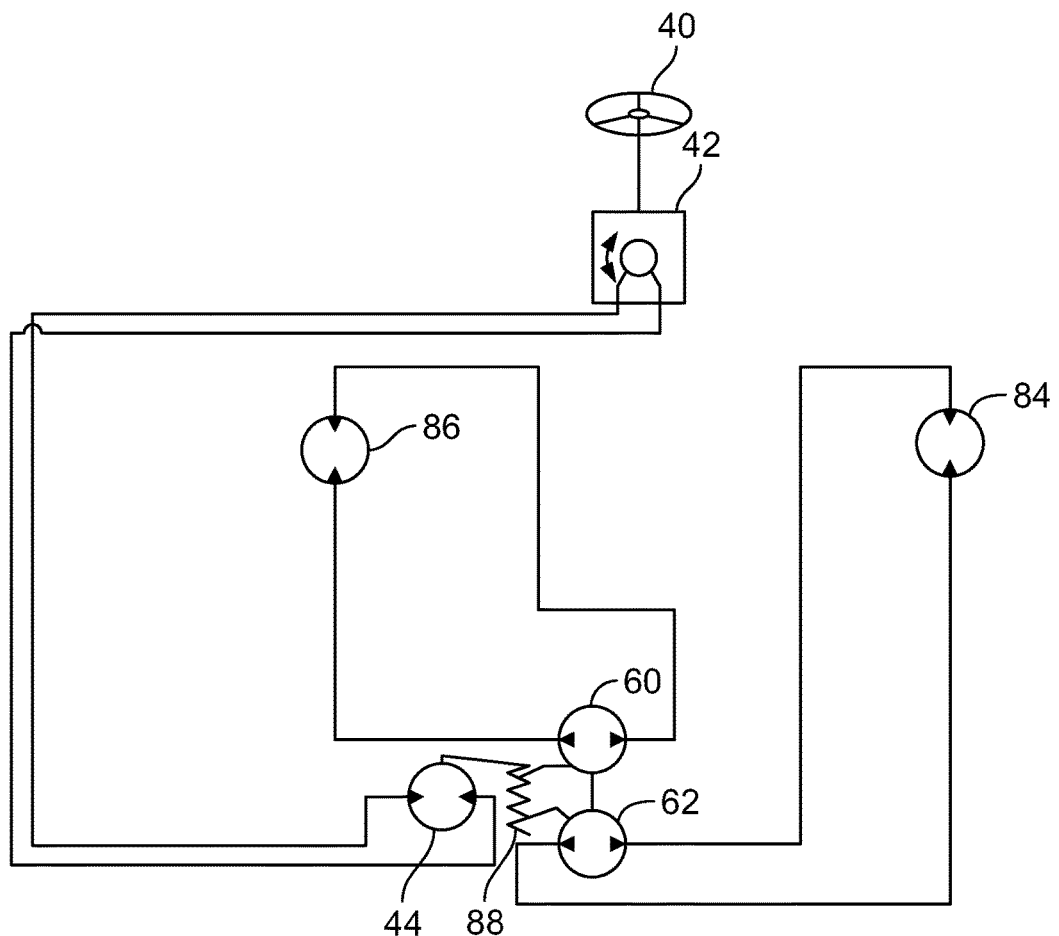
FIG. 3 is a hydraulic circuit of a steering system of a conventional windrower.
Figure 15:
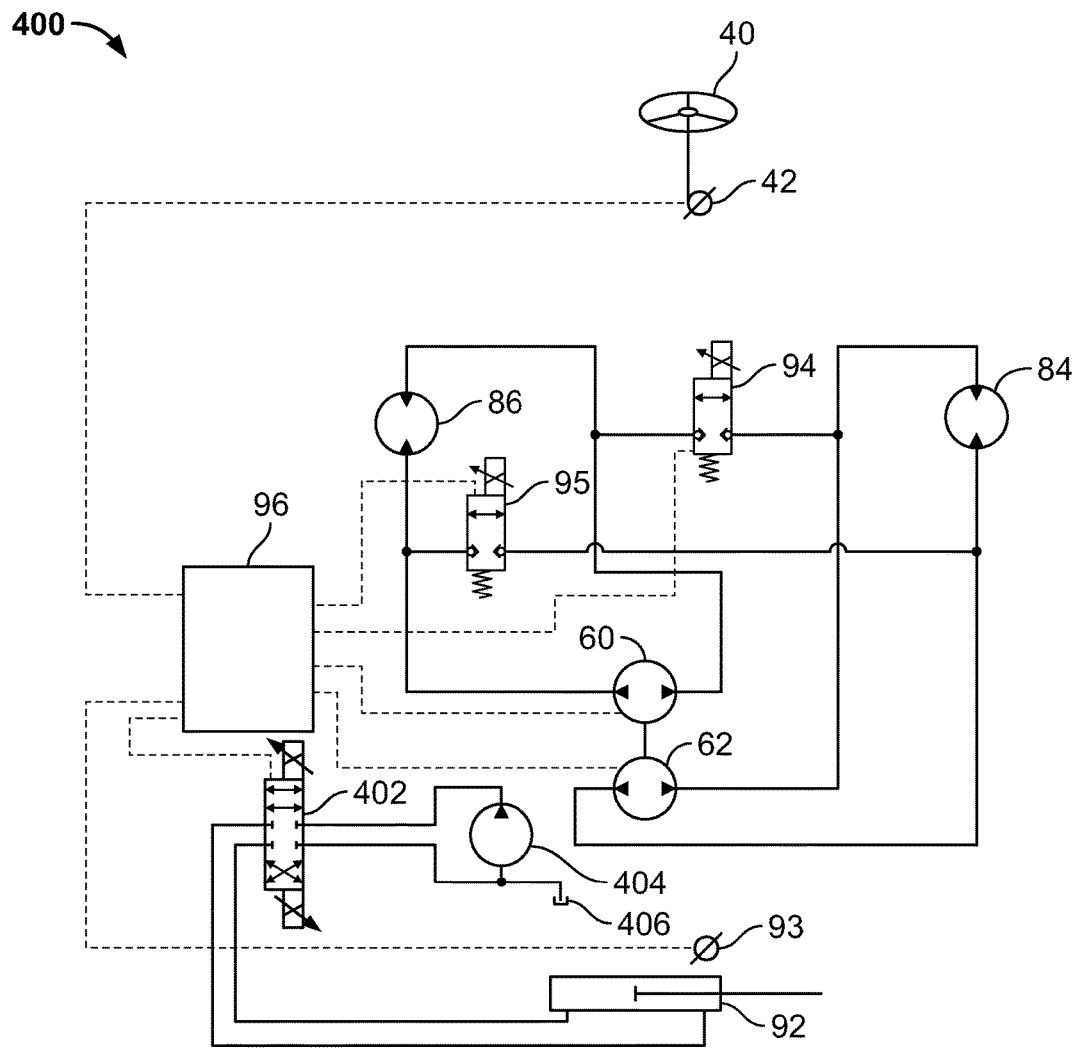
FIG. 15 is a static view of a hydraulic circuit including an exemplary rear steering system of the present disclosure.

FIG. 15 is a hydraulic circuit 400 for an electro-hydraulic steering system with the disclosed limited slip hydraulic differential drive for rear steering (e.g., steer by wire). The hydraulic circuit 400 can include similar components to the hydraulic circuit 150 of FIG. 3, and therefore refers to similar components with the same reference numbers. The hydraulic circuit 400 includes a rear steering valve 402, and a rear steer pump 404 in fluid communication with a reservoir 406.

Figure 16:
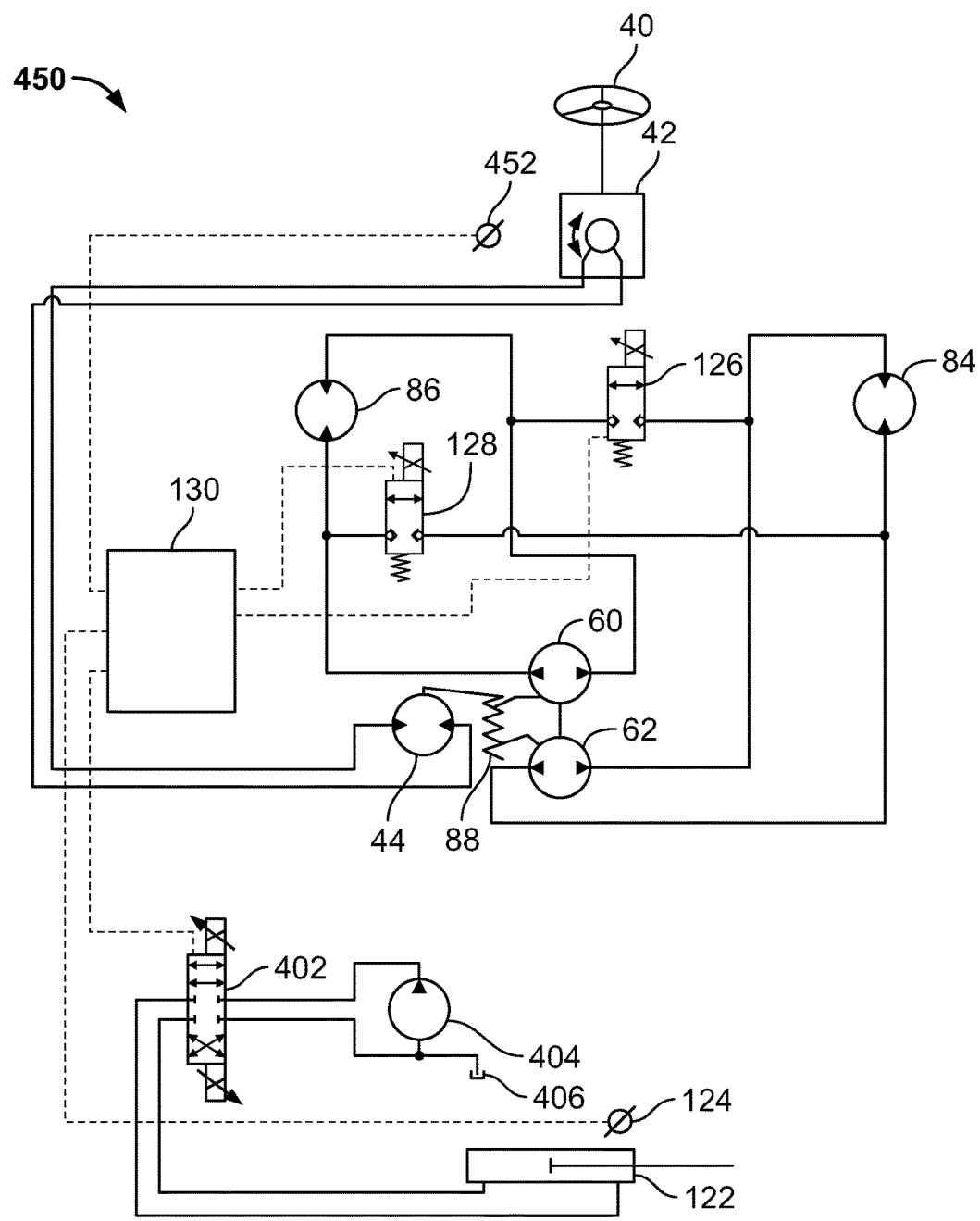
FIG. 16 is a hydraulic circuit of an exemplary steering system of the present disclosure.

FIG. 16 is a hydraulic circuit 450 for an electro-hydraulic steering system. The hydraulic circuit 450 can include similar components to the hydraulic circuits 150, 400 of FIGS. 3 and 15, and therefore refers to similar components with the same reference numbers. The hydraulic circuit 450 includes a position sensor 452 associated with the steering control valve 42. In some embodiments, the ground drive pumps can continue to vary displacement based on the steering input and the crossover valves can remain open to allow for crossover flow. Such configuration can substantially eliminate the tendency for the rear axle steering to fight the dual path steering at high speeds.

In particular, if the two systems are not in-phase, the crossover flow allows the correct wheel speeds for a given turn to be achieved in the same way as when the pump displacements are equal. The hydraulic circuit 450 also allows for smaller crossover components to be used, since the flow requirements for each ground drive motor are close to that requirement for the commanded turn with only minimal crossover flow to compensate for the mis-phase of steering. The hydraulic circuit 450 therefore allows for EDC control with the pumps during field or road operation (or with a hybrid system as shown in FIG. 16), wherein the steering motor is controlled by a mechanical steering valve 42 and the rear axle steering cylinder 122 is controlled by a dedicated steering valve 402 and pump 404.

While exemplary embodiments have been described herein, it is expressly noted that these embodiments should not be construed as limiting, but rather that additions and modifications to what is expressly described herein also are included within the scope of the present disclosure. Moreover, it is to be understood that the features of the various embodiments described herein are not mutually exclusive and can exist in various combinations and permutations, even if such combinations or permutations are not made express herein, without departing from the spirit and scope of the present disclosure.

The invention claimed is:

1. A steering system for a harvester, comprising:
one or more drive pumps in communication with a steering mechanism;
a right-hand side drive motor in communication with the one or more drive pumps via right-hand side drive lines;
a left-hand side drive motor in communication with the one or more drive pumps via left-hand side drive lines; and
a manifold in communication with the steering mechanism;
wherein the manifold is in fluid communication with the left-hand side and right-hand side drive motors via crossover lines; and
wherein in a rear axle steering operation mode, hydraulic fluid is allowed to flow between the left-hand side and right-hand side drive motors through the crossover lines to regulate a speed differential between wheels associated with the left-hand side and right-hand side drive motors.

2. The steering system of claim 1, wherein the steering mechanism is at least one of a steering motor or an electronic steering valve.

3. The steering system of claim 1, wherein in the right-hand and left-hand side drive motors are electronic displacement controlled motors, and the drive pumps are electronic displacement controlled pumps.

4. The steering system of claim 1, comprising one or more valves disposed in the manifold or the crossover lines for regulating flow through the crossover lines between the left-hand side and right-hand side drive motors.

5. The steering system of claim 4, wherein the one or more valves are proportional valves.

6. The steering system of claim 4, wherein the one or more valves are flow control valves.

7. The steering system of claim 4, comprising a sensor configured to detect a rotational position of at least one of a steering wheel or a rear steering cylinder.

8. The steering system of claim 7, wherein based on the detected rotational position, the valves are regulated to vary an amount of flow of the hydraulic fluid through the crossover lines.

9. The steering system of claim 8, wherein in the rear axle steering operation mode and the harvester being driven in a turning maneuver, the valves are regulated to open proportionally to the detected rotational position to regulate the speed differential between the wheels associated with the left-hand side and right-hand side drive motors.

10. The steering system of claim 7, comprising a controller configured to receive signals from the sensor regarding the detected rotational position and regulate the valves based on the detected rotational position.

11. The steering system of claim 4, wherein in the rear axle steering operation mode and the harvester is driven in a substantially straight line, the one or more valves are regulated to a minimally open position.

12. The steering system of claim 1, wherein in a field operation mode, one or more valves in the manifold are closed to prevent the hydraulic fluid from flowing between the left-hand side and right-hand side motors.

13. The steering system of claim 12, wherein in the field operation mode, displacements of the right-hand side and left-hand side drive motors are equal.

14. The steering system of claim 1, comprising a rear axle steering cylinder in fluid communication with the manifold.

15. The steering system of claim 1, comprising a steering valve in fluid communication with the manifold, a tank, and a pump supply.

16. A harvester, comprising:
a frame;
at least one front axle comprising first and second front wheels pivotally mounted to the front axle;
at least one rear axle comprising first and second casters pivotally mounted to the rear axle; and
a steering system comprising:
one or more drive pumps in communication with a steering mechanism;
a right-hand side drive motor in communication with the one or more drive pumps via right-hand side drive lines;
a left-hand side drive motor in communication with the one or more drive pumps via left-hand side drive lines; and
a manifold in communication with the steering mechanism;
wherein the manifold is in fluid communication with the left-hand side and right-hand side drive motors via crossover lines; and
wherein in a rear axle steering operation mode, hydraulic fluid is allowed to flow between the left-hand side and right-hand side drive motors through the crossover lines to regulate a speed differential between first and second front wheels associated with the left-hand side and right-hand side drive motors.

17. The harvester of claim 16, comprising one or more valves disposed in the manifold or the crossover lines for regulating flow through the crossover lines between the left-hand side and right-hand side drive motors.

18. The harvester of claim 17, wherein the one or more valves are proportional valves.

19. A method of steering a harvester, comprising:
actuating a steering system of the harvester into a rear axle steering operation mode, the steering system comprising:
one or more drive pumps in communication with a steering mechanism;
a right-hand side drive motor in communication with the one or more drive pumps via right-hand side drive lines;
a left-hand side drive motor in communication with the one or more drive pumps via left-hand side drive lines; and
a manifold in communication with the steering mechanism;
wherein the manifold is in fluid communication with the left-hand side and right-hand side drive motors via crossover lines; and
regulating one or more valves within the manifold to control an amount of flow of hydraulic fluid between the left-hand side and right-hand side drive motors through the crossover lines to regulate a speed differential between wheels associated with the left-hand side and right-hand side drive motors.

20. The method of claim 19, comprising detecting a rotational position of at least one of a steering wheel or a rear steering cylinder with a sensor, and regulating the amount of flow of the hydraulic fluid between the left-hand side and right-hand side drive motors with a controller based on the detected rotational position.

* * * * *